F. C. BUSCHE.
BAKER'S OVEN.
APPLICATION FILED DEC. 1, 1908.
927,108.
Patented July 6, 1909.
2 SHEETS—SHEET 1.
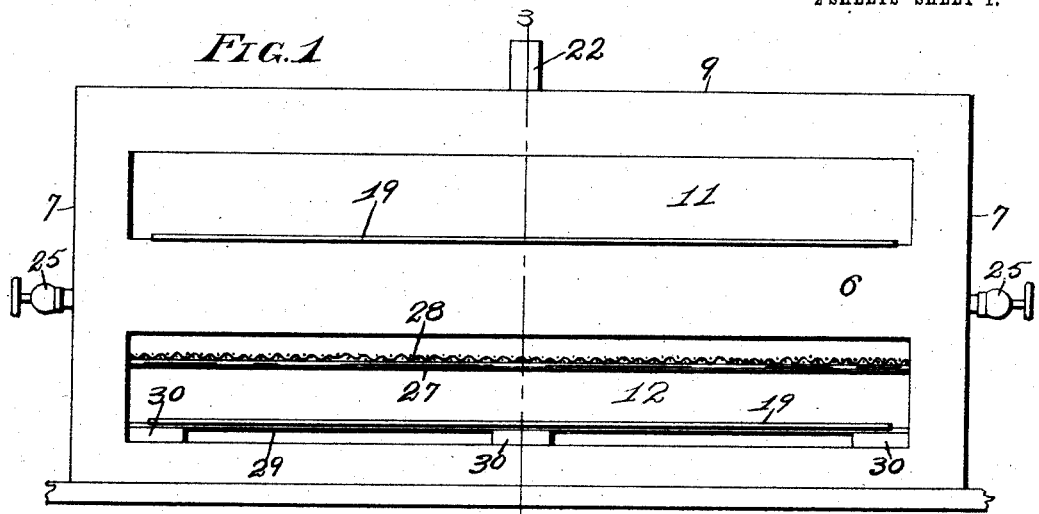
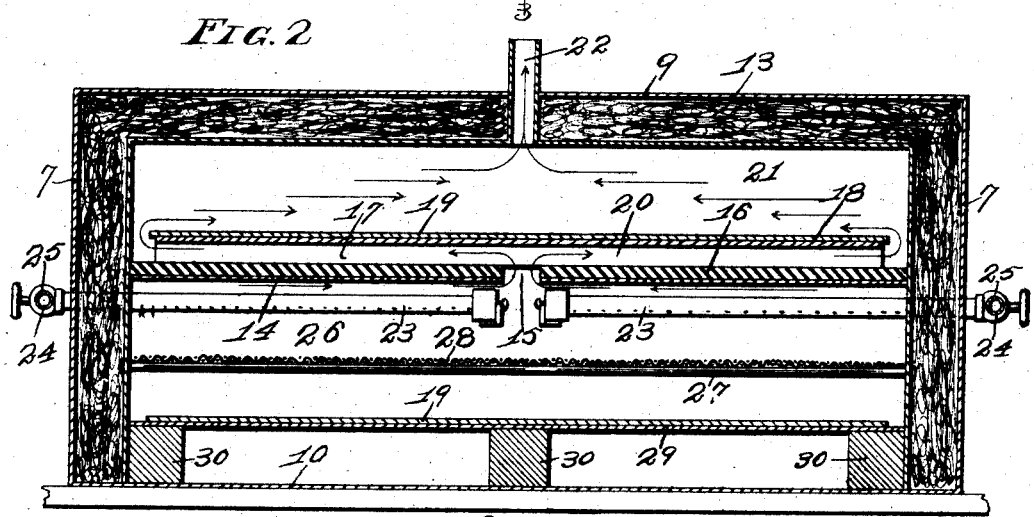
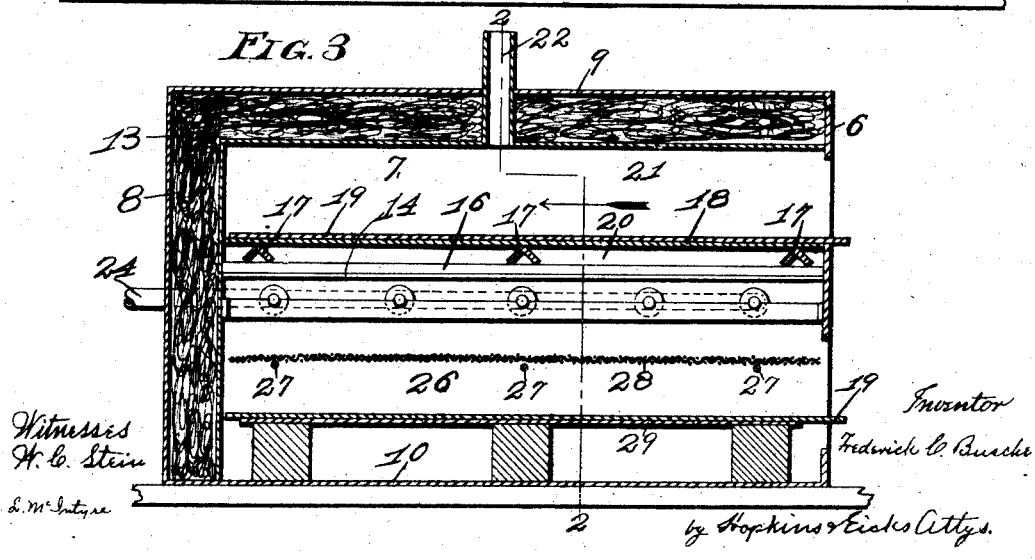

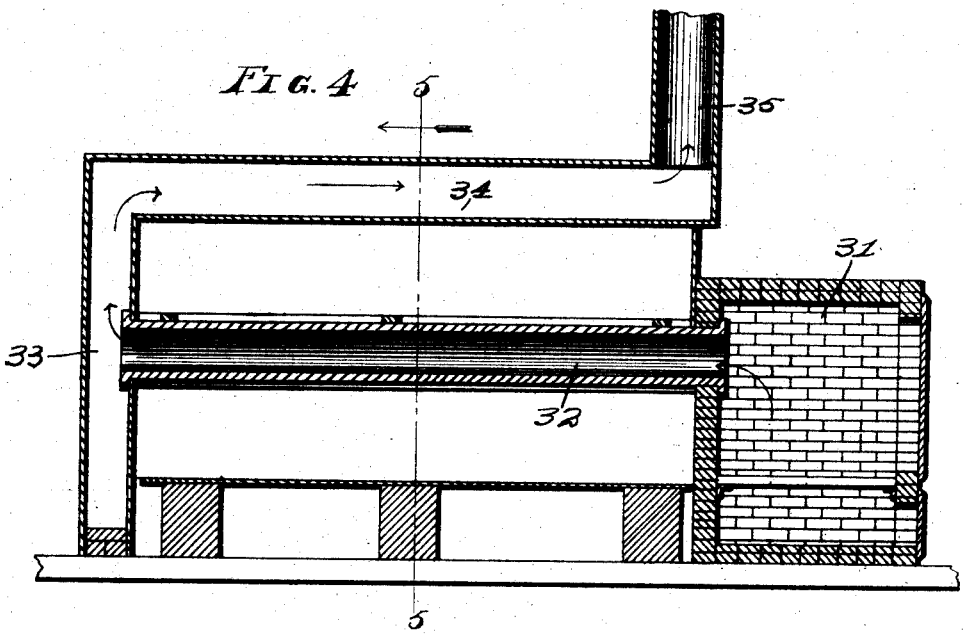
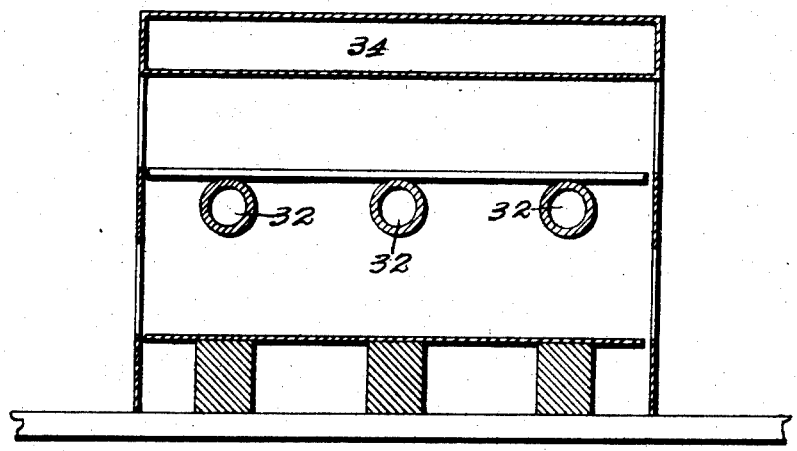

UNITED STATES PATENT OFFICE.

FREDERICK C. BUSCHE, OF ST. LOUIS, MISSOURI.

BAKER'S OVEN.

No. 927,108.  Specification of Letters Patent.  Patented July 6, 1909.

Application filed December 1, 1908. Serial No. 465,588.

*To all whom it may concern:*

Be it known that I, FREDERICK C. BUSCHE, a citizen of the United States, and resident of St. Louis, Missouri, have invented certain new and useful Improvements in Bakers' Ovens, of which the following is a specification.

This invention relates to improvements in bakers' ovens and has for its object a housing constructed with a false bottom and a centrally located heating device so that the articles to be baked can be placed first above the burners and then below the same, so as to rapidly and effectually bake the articles.

In the drawings—Figure 1 is a front elevation of my complete oven. Fig. 2 is a sectional view of the same, taken on the line 2—2 of Fig. 3. Fig. 3 is a central cross-sectional view taken on the line 3—3 of Fig. 1. Fig. 4 is a central sectional view of a modified form of heating mechanism. Fig. 5 is a sectional view taken on the line 5—5 of Fig. 4.

In the construction of my invention I provide a housing composed of a front wall 6, end walls 7, a rear wall 8, a top 9, and a bottom 10. The front wall 6 is provided with two elongated openings 11 and 12. The rear wall, end walls and top are constructed of double thickness and packed with material 13, such as asbestos, mineral wool or the like, so as to retain the heat within the inclosure.

Within the housing is located a false bottom 14 having a central elongated opening or passageway 15 through which the heat may pass in order to circulate properly, and on the top of said false bottom is placed a layer of asbestos or the like 16. On the top of these layers are angle bars 17 on which is placed a deflector shelf 18 and on said shelf is placed the baking pans 19. The said shelf forms a passage way 20 between the same and the false bottom through which the heat is directed to the right and left passage through the upper compartment 21 and out through the flue 22, the heat circulation being indicated by the arrows in Fig. 2.

Beneath the false bottom are located burners 23 extending through the end walls and connected to the supply pipe 24 and each burner is regulated by the valves 25. Beneath the false bottom is located the lower compartment 26 through which extends a plurality of supporting rods 27 on which is mounted a reticulated shelf 28 which acts as a screen preventing the heat from directly contacting with the material to be baked, which material is placed at the proper intervals during the baking process on the bottom 29 mounted on supports 30. The object of placing the bottom 29 upon supports a reasonable distance away from the table line is to prevent the overheating of the surface on which the oven is mounted.

An oven of this construction is especially designed for baking cookies or wafers, where an excessive heat and rapid baking is required. The small particles of dough are placed upon the pans 19, first inserted in the upper compartment 21, baking the articles from below, then the pan is removed and placed on the bottom 29 in the lower compartment and the articles are browned by the overhanging heat. By referring to Figs. 4 and 5, I show an oven similarly constructed, with the exception that in the heating device in this instance I use a furnace 31 built at one side of the oven and connecting with the furnace and extending through the oven is a plurality of flues 32, terminating in a passage 33, the heat passing upwardly through the passage 34 located on the top and out through the chimney 35. In this instance, the baking pans are first placed above the flues 32 and then below, in the manner previously described.

Having fully described my invention, what I claim as new and desire to have secured to me by the grant of Letters Patent, is:

1. A baker's oven comprising a housing, a divided false bottom, an upper and lower compartment formed by said false bottom, one side of said housing provided with openings corresponding with the compartments through which the material is passed, gas burners located below the false bottom for heating the compartments, a bottom in the lower compartment, and a reticulated shelf located in said lower compartment above the bottom, substantially as specified.

2. A baker's oven comprising a housing having elongated openings in its one side through which the material to be baked is passed, a false bottom provided with an elongated passage centrally located, an upper and lower compartment formed by said false bottom, a deflector shelf located above the false bottom, forming a heat passage, burners located beneath the false bottom, a reticulated shelf located beneath the burners for deflecting the excessive heat from the articles to be baked, substantially as specified.

3. In a baker's oven, the combination of a housing; of a false bottom provided with a central elongated slot located in the housing and dividing the same into two compartments; a deflector shelf located on the top of the false bottom forming a heat passage directing the heat beneath the deflector plate to the sides of the upper compartment, and permitting the heat to circulate in the compartment above the deflector plate; of a plurality of burners suspended beneath the false bottom; a bottom located in the lower compartment on which the articles to be baked are placed after being removed from the upper compartment; a reticulated shelf located in the lower compartment midway between the bottom and the burners; and a flue located in the top of the housing through which may pass the heat from the compartments, substantially as described.

In testimony whereof, I have signed my name to this specification, in the presence of two subscribing witnesses.

FREDERICK C. BUSCHE.

Witnesses:
ALFRED A. EICKS,
WALTER C. STEIN.